United States Patent [19]
Peart

[11] Patent Number: 5,533,742
[45] Date of Patent: Jul. 9, 1996

[54] ALL-TERRAIN BICYCLE FRAME

[75] Inventor: Stephen Peart, Los Gatos, Calif.

[73] Assignee: Axis Bicycle Incorporated, Campbell, Calif.

[21] Appl. No.: 740,940

[22] Filed: Aug. 6, 1991

[51] Int. Cl.$^6$ .................... B62K 3/02; B62K 19/16
[52] U.S. Cl. .................... 280/281.1; 280/288.3
[58] Field of Search .................... 280/281.1, 283, 280/274, 284, 279, 288.3; 264/45.5

[56] References Cited

U.S. PATENT DOCUMENTS

| | | | |
|---|---|---|---|
| D. 157,322 | 2/1950 | Baretta . | |
| D. 220,600 | 4/1971 | Hill | D90/8 |
| D. 294,338 | 2/1988 | Yamada et al. | D12/110 |
| 462,115 | 10/1891 | Eisenhart | 280/281.1 X |
| 1,978,653 | 10/1934 | Smith | 280/274 |
| 3,619,436 | 11/1971 | Gruss et al. | 264/45.5 |
| 3,952,123 | 4/1976 | Kopernik | 264/45.5 |
| 3,981,504 | 9/1976 | Gugel | 264/45.5 |
| 4,049,768 | 9/1977 | Luthra | 264/45.5 |
| 4,293,141 | 10/1981 | Brilando | 280/281.1 |
| 4,534,578 | 8/1985 | Keller | 280/281.1 |
| 4,613,146 | 9/1986 | Sharp et al. | 280/281.1 |
| 4,674,170 | 6/1987 | Hubbert et al. | 264/45.5 |
| 4,787,648 | 11/1988 | Coetzee | 280/275 |
| 4,850,607 | 7/1988 | Trimble | 280/281.1 |
| 4,923,203 | 5/1990 | Trimble et al. | 280/281.1 X |
| 5,039,470 | 8/1991 | Bezin et al. | 280/279 X |
| 5,076,601 | 12/1991 | Duplessis | 280/281.1 |
| 5,080,842 | 1/1992 | Jäger | 264/45.5 |

FOREIGN PATENT DOCUMENTS

| | | | |
|---|---|---|---|
| 0352663 | 1/1990 | European Pat. Off. | 280/281.1 |
| 2647079 | 11/1990 | France | 280/281.1 |
| 3807369 | 9/1989 | Germany | 280/281.1 |
| 3838425 | 5/1990 | Germany | 280/281.1 |
| 8908039 | 9/1989 | WIPO | 280/281.1 |

*Primary Examiner*—Brian L. Johnson
*Attorney, Agent, or Firm*—Kolisch, Hartwell, Dickinson, McCormack & Heuser

[57] ABSTRACT

An injection molded, single-piece plastic bicycle frame which includes a generally upright stem, and a cantilever structure joined to and extending from opposite sides of the stem in a gently curving, downwardly facing reverse bend. The material forming the frame has a nonuniform internal structural density which is characterized by higher density adjacent the surface, and by decreasing density progressing toward the core. This material preferably takes the form of a foamed structural plastic material.

3 Claims, 1 Drawing Sheet

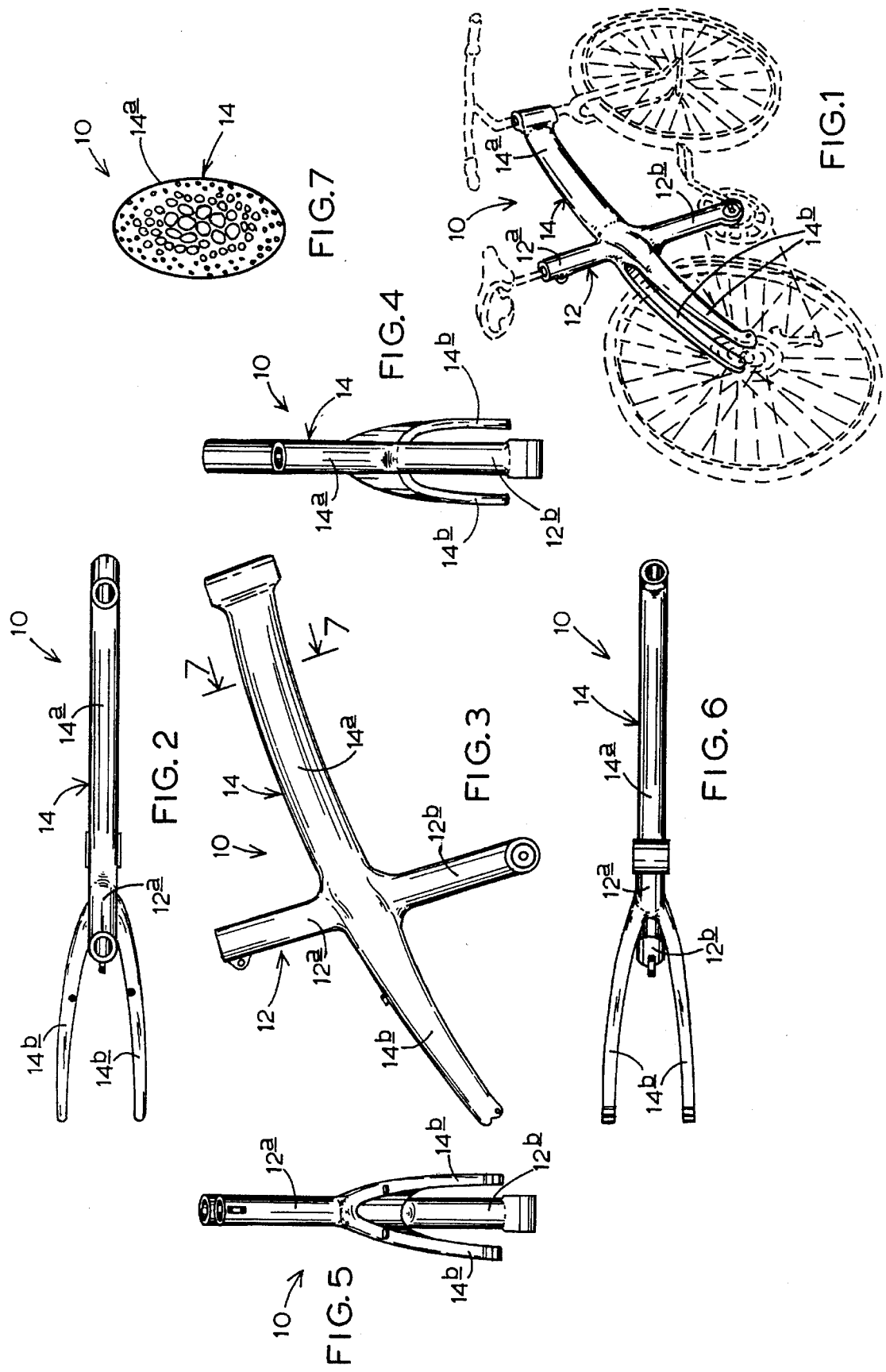

ALL-TERRAIN BICYCLE FRAME

BACKGROUND AND SUMMARY OF THE INVENTION

This invention pertains to an all-terrain bicycle frame, and more particularly to such a frame which is formed as a unit from a foamed, molded structural plastic material that offers extremely high-strength performance in a low-weight body, and which features a gently, downwardly reversely bent forwardly and rearwardly projecting cantilever structure that offers superior vertical-load deflection response when a bicycle employing the frame is ridden over rough terrain.

In recent years, there has been literally an explosion of interest in what might be thought of as new-performance bicycles having innovative structures and features which greatly expand the arenas for practical sporting and other bicycle use. Witness, for example, the recent extensive proliferation of so-called mountain bicycles, and their related "progeny", which have enabled enthusiasts easily to "take on" previously forbidding, or at least very difficult-to-handle, terrain, vis-a-vis predecessor two-wheeled vehicles.

As is often the case with such an expansive, new-phase development in a field of art, creators continually seek new and better solutions to offer structures, etc., having even greater flexibility, better performance, lower cost, lighter-weightness, and so on. It is in this setting that the all-terrain bicycle frame of the present invention especially shines, and casts, in its contributive glow, significant performance shadows of its would-be competitors.

According to a preferred embodiment of the invention, the proposed frame is molded as a single lightweight unit, formed of a foamed, high-strength structural plastic material which offers decidedly improved weight/strength characteristics. The frame includes a central, generally upright stem, from the front and rear of which projects gently downwardly curving, integral cantilever structure, including a forwardly projecting strut, and a pair of rearwardly projecting arms. Throughout this structure, the foamed material forming it is characterized by differential density (as a cross section of the same is viewed), with such density being highest near the outer surfaces of the structure, and lowest near the core of the structure.

The foamed, differential-density characteristic of the frame material is a principal and significant contributor toward lightweightness and performance strength—offering lightweightness through the controlled presence of material void spaces, progressing toward the core areas of the frame, and at the same time offering extremely good performance strength by maintaining high material density near the stress-bearing outer skin regions of the structure. The gently, downwardly curving cantilever structure mentioned offers an advantage, during use of the frame in the setting of a ridden bicycle, in that it tends to act as an especially good vertical-shock, load-bearing spring.

These and other objects and advantages which are attained by the invention will become more fully apparent as the description which now follows is read in conjunction with the accompanying drawings.

DETAILED DESCRIPTION OF THE DRAWINGS

FIG. 1 is a right, rear, lateral perspective of the frame of the invention shown pseudo-incorporated with other components of an all-terrain bicycle, which other components (all conventional) are represented in phantom, dashed lines.

FIG. 2 is a top plan view of the frame of the invention (isolated from other structures).

FIG. 3 is a right side elevation, taken generally from the bottom side of FIG. 2, with the frame shown in the orientation which a viewer would perceive with the frame incorporated in a bicycle, and with the latter resting on substantially level ground.

FIGS. 4 and 5 are end elevations taken from the right and left sides, respectively, of FIG. 3.

FIG. 6 is a bottom plan view taken generally from the bottom side of FIG. 3.

FIG. 7 is an enlarged cross-section, taken generally along the line 7—7 in FIG. 3, illustrating the differential-density characteristic of the foamed structural plastic material making up the frame of the invention.

DETAILED DESCRIPTION OF, AND BEST MODE FOR CARRYING OUT, THE INVENTION

Turning now to the drawings, and referring first of all to FIGS. 1–6, inclusive, indicated generally at 10 is an all-terrain bicycle frame constructed in accordance with the present invention. Frame 10 includes an upright stem 12, including upper and lower stem portions 12a, 12b, respectively, and joining integrally with this stem, a cantilever structure 14, including a forwardly projecting strut 14a, and a pair of rearwardly projecting arms 14b. In its "general" organization, frame 10 is equipped, at the outer ends of stem portions 12a, 12b, strut 14a and arms 14b, to accept and receive the usual other bicycle components (all conventional) which cooperate with the frame to make up a complete, working, all-terrain bicycle. For example, and as can be seen in FIG. 1, the upper end of stem portion 12a is equipped to receive (and is shown receiving) a bicycle seat, the lower end of stem portion 12b a drive sprocket and pedal structure, the outer end of strut 14a the usual front-wheel-supporting fork, and associated steering handlebar assembly, and the rear ends of arms 14b the usual rear wheel and associated driven sprocket assembly. These conventional other components are shown only in phantom, dashed lines in FIG. 1, and are not specifically given reference characters herein.

An important feature to note with respect to the configuration of cantilever structure 14 is that, as can be seen clearly in FIGS. 1 and 3, this structure is characterized by a gently curving, downwardly facing reverse bend. This reverse-bend characteristic, in the performance of frame 10, contributes a vertical load-spring reaction and rapid deflection response which greatly enhances the performance of the frame over rough, bouncy and jolting terrain.

According to another very important feature of the invention, frame 10 is formed (preferably as a unit in a single-stage molding operation) from a foamed structural plastic material. During the foaming process, void spaces form to define not only a lightened-weight overall structure, but also a material-density distribution which is differentiated significantly from the surface skin regions of the frame toward the core regions therein. Put another way, the frame has a nonuniform internal structural density.

FIG. 7 in the drawings is designed to represent this characteristic, and in this figure, the generally spherical elements (only shown partially spanning the representative cross section) depict such void spaces. With respect to these spaces, one can see that they are generally smaller and further apart near the surface of the frame, and larger and closer together near the core of the frame. Also, one can see that, given this void-space distribution and characteristic, material density gradually becomes less and less as one progresses inwardly from the frame's surface toward its core. In the construction now being described, if the nominal, non-void-space density of the material making up frame 10 is D, this density progresses, inwardly from the frame's surface towards it core, from approximately D preferably to the range of approximately about 0.65D to about 0.85D.

A material which has been found to offer superiority in the making and ultimate performance of frame 10 is a thermoplastic, amorphous polyetherimide resin, a structural plastic material, made by the General Electric Company, and sold under the trade designator "Ultem". "Ultem" is a product which includes about 20% to about 30% fiberglass filling material, with the fibers in this material being about ¼- to about 2-inches long. Another like candidate for the material in frame 10 is an amorphous polyamid-imide, fiber-reinforced, structural plastic material made by Amoco Corporation, and sold under the trade designator "Torlon".

These materials, during the molding process, are foamed conventionally to transform them into a structural foam material by the addition of one of a number of known, commercially available "blowing agents"—for example a blowing agent product made by the General Electric Company and sold under the product designator "C-20".

As was suggested above, in FIG. 1, frame 10 is shown as it would typically be assembled with other components (conventional components) to make up an all-terrain bicycle employing the invention.

While a preferred embodiment of the frame of the invention has been disclosed and described herein, I recognize that variations and modifications may be made to fit different circumstances. For example, precise frame size and dimensionality can be changed as desired, and various cross-sectional configurations of the different portions of the integrated frame may also be changed. In each such variation, differential density, as described above, in the foamed, structural plastic material which makes up the frame, offers lightweightness, and good stress and load transmission near the skin or surface of the frame elements. All of these variations may be made without departing from the spirit of the invention.

It is claimed and desired to secure by letters patent:

1. An injection-molded, single-piece, structural-foam plastic bicycle frame comprising a central, elongate generally upright rider load-bearing stem, including an upper stem portion adapted to receive a bicycle seat, and a lower stem portion adapted to receive drive sprocket and pedal structure, and cantilever structure joined to and extending from opposite sides of said stem in the region of proximal adjacency of said stem portions in a gently curving, downwardly facing reverse bend which leads toward opposite, free ends in the structure, said cantilever structure cooperating with said stem to receive therefrom the full load of any rider borne by the stem.

2. The frame of claim 1, wherein the material forming said frame has a nonuniform internal structural density characterized by higher density adjacent the surface, and by decreasing density progressing toward the core.

3. The frame of claim 2, wherein such nonuniform density is achieved by the process of foaming during molding.

\* \* \* \* \*